United States Patent
Kiss (10) Patent No.: US 8,081,586 B2
(45) Date of Patent: Dec. 20, 2011

(54) METHOD AND APPARATUS TO CONVEY A URI FOR CONTENT INDIRECTION USE IN SIP

(75) Inventor: Krisztian Kiss, Del Mar, CA (US)

(73) Assignee: Nokia Corporation, Espoo (FI)

( * ) Notice: Subject to any disclaimer, the term of this patent is extended or adjusted under 35 U.S.C. 154(b) by 1198 days.

(21) Appl. No.: 11/070,916

(22) Filed: Mar. 2, 2005

(65) Prior Publication Data

US 2005/0226174 A1 Oct. 13, 2005

Related U.S. Application Data (60) Provisional application No. 60/560,514, filed on Apr. 7, 2004.

(51) Int. Cl.
*H04B 1/44* (2006.01)
*H04L 12/66* (2006.01)
*G06F 15/16* (2006.01)

(52) U.S. Cl. ......... 370/282; 370/352; 709/203; 709/229

(58) Field of Classification Search ............... 455/67.1, 455/414.2; 370/253, 349, 352, 471, 282; 709/203, 224, 229
See application file for complete search history.

(56) References Cited

U.S. PATENT DOCUMENTS

2002/0152215 A1 10/2002 Clark et al.
2003/0040280 A1* 2/2003 Koskelainen ............... 455/67.1
2003/0184793 A1* 10/2003 Pineau ..................... 358/1.15
2004/0107143 A1 6/2004 Niemi
2005/0209927 A1* 9/2005 Aaltonen et al. ............... 705/26

FOREIGN PATENT DOCUMENTS

KR 2002-0008828 1/2002
WO WO 2004/038933 A2 5/2004
WO WO 2004/038933 A3 5/2004

OTHER PUBLICATIONS

S. Olson, A Mechanism for Content Indirection in Session Initiation Protocol (SIP) Messages, Jun. 2, 2003, IETF.*
Betsy Kidwell, 3rd Generation Parternship Project 2 X.P0016-312, 2003, 3GPP2.*
Jane Humphrey, Request for Clarification on the Scope of the Ut Interface towards the OSA-SCS, Dec. 10, 2003, CN5.*
J. Rosenberg et al., RFC 3261 SIP: Session Initiation Protocol, Jun. 2002.*
"MMS MM1 Stage 3 Using SIP", 2003, pp. 1-34, Third Generation Partnership Project 2, X.P0016-312 (to be published as 3GPP2X. S0042-312).

(Continued)

*Primary Examiner* — Ahmad Matar
*Assistant Examiner* — Nafiz E Hoque
(74) *Attorney, Agent, or Firm* — Harrington & Smith (57) ABSTRACT

A content indirection communications method, server, device, data storage medium and computer program product, where in a method executed by the server, in response to a Session Initiation Protocol (SIP) registration request from a device, informing the device in a SIP message of the identity of an address where the device may send information that is to be referenced by a SIP content indirection operation, and allocating storage for the information. Informing the device preferably uses a SIP message Call-Info header field with a purpose parameter set to ci-uri for indicating that the Call-Info header field contains a Uniform Resource Identifier (URI) that specifies an identity of the storage location.

47 Claims, 2 Drawing Sheets

OTHER PUBLICATIONS

"Request for clarification on the scope of the Ut interface towards the OSA-SCS", Oct. 27-31, 2003, Joint API-group (Parlay, ETSI Project OSA, 3GPP TSG_CN WG5).

"MMS Interworking Guidelines", Feb. 2003, pp. 1-20, GSM Association, Permanent Reference Document: IR.52, Version 3.1.0.

Khartabil, H. et al., "Conveying a Session Policy Uniform Resource Identifier (URI) in the Session Initiation Protocol (SIP)", draft-khartabil-sip-policy-uri-call-info-purpose-00, Feb. 5, 2004, pp. 1-7.

Olson, S., "A Mechanism for Content Indirection in Session Initiation Protocol (SIP) Messages", draft-ietf-sip-contentindirect-mech-03, Jun. 2, 2003, pp. 1-18.

Rosenberg, J. et al., "SIP: Session Initiation Protocol", Jun. 2002, pp. 1-252.

Petrie, D., "A Framework for SIP User Agent Profile Delivery", draft-ietf-sipping-config-framework-01-txt, Oct. 22, 2003, pp. 1-22.

Olson, S., "A Mechanism for Content Indirection in Session Initiation Protocol (SIP) Messages", Jun. 2, 2003, pp. 1-17.

Khartabil Nokia H., "Congestion safety and Content Indirection draft-khartabil-sip-congestionsafe-ic-02.txt" IETF Standard-Working-Draft, Internet Engineering Task Force, IETF, CH, No. 2, Mar. 3, 2003, XP015003931 ISSN: 0000-0004.

* cited by examiner

METHOD AND APPARATUS TO CONVEY A URI FOR CONTENT INDIRECTION USE IN SIP

CLAIM OF PRIORITY FROM COPENDING PROVISIONAL PATENT APPLICATION

This patent application claims priority under 35 U.S.C. §119(e) from Provisional Patent Application No. 60/560,514, filed Apr. 7, 2004, the disclosure of which is incorporated by reference herein in its entirety.

TECHNICAL FIELD

This invention relates generally to wireless communications systems and methods and, more specifically, relates to wireless terminals and wireless network nodes that use a Session Initiation Protocol (SIP) or similar or equivalent messaging exchange.

BACKGROUND

The Session Initiation Protocol (SIP) is defined in IETF RFC3261 (Rosenberg et al., June 2002). In general, the SIP is an application-layer control (signaling) protocol for creating, modifying and terminating sessions with one or more participants. The sessions can include Internet telephone calls, multimedia distribution and multimedia conferences. SIP invitations used to create sessions carry session descriptions that allow participants to agree on a set of compatible media types. SIP makes use of elements called proxy servers to help route requests to the user's current location, authenticate and authorize users for services, implement provider call-routing policies and provide features to users. SIP also provides a registration function that allows users to upload their current locations for use by proxy servers. SIP runs on top of several different transport protocols.

In addition, an IETF draft "draft-ietf-sip-content-indirect-mech-03", entitled "A Mechanism for Content Indirection in Session Initiation Protocol (SIP) Messages" (S. Olson, Jun. 2, 2003), describes the mechanism to provide for content indirection in SIP messages. More specifically, the purpose of the SIP is to create, modify, or terminate sessions with one or more participants, and SIP messages, like HTTP, are syntactically composed of a start line, one or more headers, and an optional body. Unlike HTTP, SIP is not designed as a general purpose transport of data.

There are various reasons why it may be desirable to indirectly specify the content of the SIP message body. For bandwidth limited applications, such as in cellular wireless applications, indirection provides a means to annotate the (indirect) content with meta-data which may be used by the recipient to determine whether or not to retrieve the content over the resource limited link. It is also possible that the content size to be transferred might potentially overwhelm intermediate signaling proxies, thereby unnecessarily increasing network latency. For time-sensitive SIP applications, this may be unacceptable. The use of indirect content can alleviate these shortcomings by moving the transfer of the content out of the SIP signaling network and into a potentially separate data transfer channel. There may also be scenarios where the session related data (body) that needs to be conveyed does not directly reside on the endpoint or User Agent (UA). In such scenarios, it is desirable to have a mechanism whereby the SIP message can contain an indirect reference to the desired content. The receiving party would then use this indirect reference to retrieve the content via a non-SIP transfer channel, such as HTTP, FTP, or LDAP. It is stated in this IETF draft that the purpose of content indirection is purely to provide an alternative transport mechanism for SIP Multipurpose Internet Mail Extensions (MIME) body parts. With the exception of the transport mechanism, indirected body parts are equivalent, and should have the same treatment, as in-line body parts.

In general, MIME is originally intended to extend the format of Internet mail to allow non-US-ASCII textual messages, non-textual messages, multipart message bodies and non-US-ASCII information in message headers. The following RFCs define MIME: RFC 2045: MIME Part One: Format of Internet Message Bodies; RFC 2046: MIME Part Two: Media Types; RFC 2047: MIME Part Three: Message Header Extensions for Non-ASCII Text; RFC 2048: MIME Part Four: Registration Procedures; and RFC 2049: MIME Part Five: Conformance Criteria and Examples.

Another IETF draft "draft-khartabil-sip-policy-uri-call-info-purpose-00", entitled "Conveying a Session Policy Uniform Resource Identifier (URI) in the Session Initiation Protocol (SIP)" (H. Khartabil and A. Niemi, Feb. 5, 2004) describes an extension to a Call-Info header field for introducing a new purpose parameter value that can be used by a request originator or recipient to convey a URI where certain information to a session can be accessed. More specifically, this IETF draft provides a "policy-uri" which can be used by a conference server to indicate the URI of the conference policy to a UA participating in that conference.

The above-mentioned IETF draft document "draft-ietf-sip-content-indirect-mech-03" defines the SIP content indirection mechanism as providing an alternative transport mechanism for SIP MIME body parts. This is done by providing a URI for the indirect content, where the URI is specified in a "URI" parameter of the message/external-body MIME type.

However, before conveying this URI in a SIP request or response, the SIP client needs to be informed of the URI so that it can upload the indirect content before the indirect content is referenced in a SIP request or response. The IETF draft document draft-ietf-sip-content-indirect-mech-03 does not define the client or server behavior with respect to determining a URI to be used for content indirection. That is, what was not defined, prior to this invention, was a technique or protocol for a SIP UA to request, or be informed of, a storage location on an Application Server (AS) wherein the SIP UA can store the information that is to be referred to by a subsequent content indirection operation.

SUMMARY OF THE PREFERRED EMBODIMENTS

The foregoing and other problems are overcome, and other advantages are realized, in accordance with the presently preferred embodiments of these teachings.

In a first aspect thereof this invention provides a communications method that comprises receiving a registration request from a device; and informing the device of the identity of an address for the device to send information to be referenced by a content indirection operation.

In another aspect thereof this invention provides a device operable with a server, comprising a data processor responsive to a receipt of a second message from the server, sent in response to the device originating a first message, to extract from the second message an identify of a location for the device to send information to be referenced by a content indirection operation.

In another aspect thereof this invention provides a content indirection communications method, comprising in response to a Session Initiation Protocol (SIP) registration request from a device, informing the device in a SIP message of the identity of an address where the device may send information that is to be referenced by a SIP content indirection operation; and allocating storage for the information.

In another aspect thereof this invention provides a SIP Server that comprises a data processor that is responsive to an occurrence of a SIP registration request made by a device to inform the device by a SIP message of an identity of an address where the device may send information to be referenced by a subsequent SIP content indirection operation.

In a another aspect thereof this invention provides a device operable with a SIP Server, comprising a data processor responsive to a receipt of a SIP message from the SIP Server, sent in response to the device originating a registration request message, to extract from the SIP message an identification of a location where the device may send information to be referenced by a subsequent SIP content indirection operation.

In a further aspect thereof this invention provides a data storage medium readable by a digital data processor, said data storage medium storing program instructions for use in a content indirection procedure in a SIP operation and comprising operations of, in response to receiving a SIP registration request from a device, reserving a storage location for the device where the device may store information that is to be referenced by a SIP content indirection operation; and informing the device of an identity of the storage location using a SIP message Call-Info header field with a purpose parameter set to ci-uri for indicating that the Call-Info header field contains a Uniform Resource Identifier (URI) that specifies the identity of the storage location.

In another aspect thereof this invention provides a Multimedia Messaging Service (MMS) Relay/Server for conducting a SIP operation with a device, comprising means, responsive to receiving a SIP registration request from the device, for reserving a storage location for the device where the device may store information that is to be referenced by a SIP content indirection operation; and means for informing the device of an identity of the storage location using a SIP message Call-Info header field with a purpose parameter set to ci-uri for indicating that the Call-Info header field contains a Uniform Resource Identifier (URI) that specifies the identity of the storage location.

In a still further aspect thereof this invention provides a data storage medium readable by a digital data processor, the data storage medium storing program instructions for use in a content indirection procedure in a SIP operation and comprising operations of receiving a SIP message originated from a SIP server in response to sending a registration request message towards the SIP server; identifying a case where the received SIP message comprises a Call-Info header field having a purpose parameter set to ci-uri for indicating that the Call-Info header field contains a Uniform Resource Identifier (URI) that specifies the identity of a storage location that has been reserved for the device wherein the device may store information that is to be referenced by a SIP content indirection operation, and sending information to the storage location.

In another further aspect thereof this invention provides a device operable with a SIP Server, where the device comprises a data processor that operates in response to a receipt of a SIP message originated from a SIP server to identify a case where the received SIP message comprises a Call-Info header field having a purpose parameter set to ci-uri for indicating that the Call-Info header field contains a Uniform Resource Identifier (URI) that specifies the identity of a storage location that has been reserved for the device wherein the device may store information that is to be referenced by a SIP content indirection operation, said data processor further operating to send information to the storage location.

In another aspect thereof this invention provides a device operable with a Session Initiation Protocol (SIP) Server, comprising means, responsive to a receipt of a SIP message originated from a SIP server to indicate success/failure of a registration request, for identifying a case where the received SIP message comprises a Call-Info header field having a purpose parameter set to ci-uri for indicating that the Call-Info header field contains a Uniform Resource Identifier (URI) that specifies the identity of a storage location that has been reserved for the device wherein the device may store information that is to be referenced by a SIP content indirection operation; and means for uploading information that corresponds to indirect content with a HTTP PUT to the storage location specified by the URI that comprises part of the Call-Info field of the SIP message.

In another aspect thereof this invention provides a SIP Server that includes a data processor that is responsive to an occurrence of a SIP registration request made by a device to inform the device by a SIP message of an identity of a storage location where the device may send information to be referenced by a SIP content indirection operation and, responsive to the device sending the information, allocating storage and directing the information to the allocated storage.

In a further aspect thereof this invention provides a method to operate a Session Initiation Protocol (SIP) Server, comprising in response to an occurrence of a SIP registration request made by a device, sending the device a SIP message that comprises an identity of a storage location where the device may send information to be referenced by a SIP content indirection operation; and responsive to the device sending the information, allocating storage and directing the information to the allocated storage.

In another aspect thereof this invention provides a computer program product operable for a SIP Server to conduct a SIP session with a device, comprising operations of, in response to an occurrence of a SIP registration request made by the device, sending the device a SIP message that comprises an identity of a storage location where the device may send information to be referenced by a SIP content indirection operation, and responsive to the device sending the information, allocating storage and directing the information to the allocated storage.

In another aspect thereof this invention provides a computer program product operable for a device to conduct a SIP operation with a SIP Server, comprising operations of receiving a SIP message originated from a SIP server in response to sending a registration request message towards the SIP server; identifying a case where the received SIP message comprises a Call-Info header field having a purpose parameter set to ci-uri for indicating that the Call-Info header field contains a Uniform Resource Identifier (URI) that specifies the identity of a storage location that has been reserved for the device wherein the device may store information that is to be referenced by a SIP content indirection operation; and sending information to the storage location.

In another aspect thereof this invention provides a method for operating a SIP Server to conduct a SIP session with a device, comprising a step for, executed in response to an occurrence of a SIP registration request made by the device, sending the device a SIP message that comprises an identity of a storage location where the device may send information to be referenced by a SIP content indirection operation; and a step for, executed in response to the device sending the information, allocating storage and for directing the information to the allocated storage.

In yet another aspect thereof this invention provides a method for operating a device to conduct a SIP operation with a SIP Server comprising, in response to receiving a SIP message originated from a SIP server in response to sending a registration request message towards the SIP server, a step for identifying a case where the received SIP message comprises a Call-Info header field having a purpose parameter set to ci-uri for indicating that the Call-Info header field contains a Uniform Resource Identifier (URI) that specifies the identity of a storage location that has been reserved for the device wherein the device may store information that is to be referenced by a SIP content indirection operation; and a step for sending information to the storage location.

BRIEF DESCRIPTION OF THE DRAWINGS

The foregoing and other aspects of the embodiments in accordance with the teachings of this invention are made more evident in the following Detailed Description of the Preferred Embodiments, when read in conjunction with the attached Drawing Figures, wherein.

DETAILED DESCRIPTION OF THE PREFERRED EMBODIMENTS

SIP defines a Call-Info header (see RFC 3261, Section 20.9, page 166). The purpose of the Call-Info header field is to provide additional information about the caller or callee, depending on whether the header is used in a request or a response. This information contains a URI, and the purpose of the URI is described by a "purpose" parameter. The "info" parameter describes the caller or callee in general, for example, through a web page. Referring to RFC 3261 at page 166, an example of the Call-Info header is given as follows:

Call-Info:   <http://www.example.com/alice/photo.jpg>;
   purpose=icon,   <http://www.example.com/alice/>;
   purpose=info.

In accordance with an aspect of this invention, a new purpose parameter value of "ci-uri" is used by an Application Server to convey a URI, which can be used by a SIP UA for content indirection.

As an example of applying this invention to a generic content indirection case, it is assumed that a server supports both SIP and HTTP, if one further assumes that the content indirection mechanism uses the HTTP URI scheme. During a SIP transaction between the client and the server (e.g., during a SIP registration transaction) the server conveys the HTTP URI in a SIP Call-Info header field specifying the storage location to be used for content indirection (see the example shown in FIG. 2 and described below).

In addition to the "purpose" parameter, it is preferred that the Call-Info header field also contain additional parameters, such as those defined in the above-captioned draft-ietf-sip-content-indirect-mech-03 document: "expiration", "access-type" and "size".

One non-limiting example of a Call-Info header field carrying an HTTP URI for "ci-uri" purposes is as follows:

Call-Info:   <http://www.example.com/the-indirect-content>
   ;purpose=ci-uri
   ;access-type="URL"
   ;expiration="Mon, 24 Jun. 2004 09:00:00 GMT"
   ;size=4123

Figure 1:
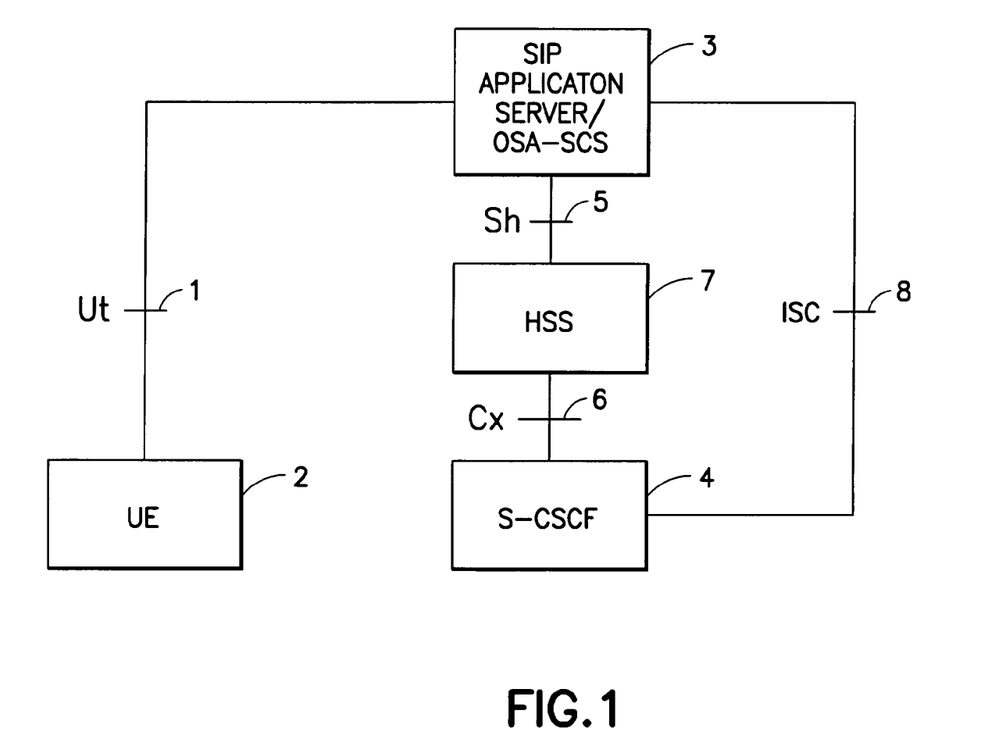
FIG. 1 is diagram showing the functional architecture of an IP Multimedia System (IMS) that is one suitable embodiment in which to practice this invention, and specifically shows the Ut interface placed between a UE and a SIP Application Server.

When applying the teachings of this invention to the IP Multimedia Subsystem (IMS) architecture, it is possible to assume than an Application Server may function as the content indirection server. Referring to FIG. 1 (obtained from document 3GPP TSG-CN Meeting #22, 10th-12th December, Maui, Hi., NP-030457), a Ut interface 1 is shown placed between the UE 2 and a SIP Application Server/OSA-SCS 3 (also referred to simply as the AS 3), that in turn is coupled to a S-CSCF 4 via Sh and Cx interfaces 5 and 6, respectively, and a HSS 7, as well as directly through an ISC interface 8. The S-CSCF 4 (Serving Call Session Control Function) is an IMS element that provides the session control services for the UE 2, which enables a network operator to support the services. Functions include: the management of mobile registrations, maintaining of the session, interaction with other services, charging and security. The HSS 7 (Home Subscriber Server) describes the various database functions that are required in modern mobile networks. These functions include the Home Location Register (HLR), the Domain Name Server (DNS) and security and network access databases.

In the context of this invention, the Ut interface 1 between the UE 2 and the AS 3 is assumed to support HTTP, and SIP communication is possible from the AS 3 to the UE 2 via the S-CSCF. During a SIP transaction between the AS 3 and the UE 2, the AS 3 can convey the "ci-uri" in the SIP Call-Info header field to the UE 2, thereby triggering the UE 2 to upload the indirect content to the AS 3 using HTTP on the Ut interface 1.

It is understood that in this embodiment, as well as the MMS embodiment described next, that the SIP Application Server and the UE or UA, which may be generically referred to herein simply as devices, each contain a programmed digital data processor of some sort that is operable for executing the SIP-related content indirection procedures in accordance with this invention. For example, the UE or UA may be embodied in a cellular telephone or a personal communicator that includes an embedded microprocessor that operates in accordance with a stored program for performing extraction of the URI from a SIP message received from the SIP Application Server, and for then subsequently sending the information to be stored at the address specified by the extracted URI, where the information is that information that is to be referenced later in a content indirection type of SIP message interaction.

In general, the various embodiments of devices corresponding to the UE or UA 2 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals or more generally devices that incorporate combinations of such functions. The teachings of this invention may also be practiced using non-wireless devices, such as desk top computers and other types of equipment that have a wired (e.g., electrical wire or optical fiber) connection to a data communications network.

Aspects of this invention thus relate as well to data storage medium for storing computer programs for operating servers and devices in accordance with this invention, as well as to computer program products executable by servers and devices so as to operate in accordance with this invention. As such, FIG. 2 shows that the UA 2 device includes a data processor (DP) 2A and a data storage medium (DSM) 2B, and the server 3 includes a DP 3A and a DSM 3B.

This invention may also be used in the context of a Multimedia Messaging Service (MMS) architecture. The Multimedia Messaging Service provides a mechanism to send not only text messages, as with the Short Message Service (SMS), but also drawings, photographs, music or voice clips and video. The system operates on the "store and forward" principle, with messages being stored and possibly formatted at a Multimedia Messaging Service Center (MMSC) when sent between users. Reference may be had, for example, to GSM Association Permanent Reference Document: IR.52, PRD IR.52, MMS Interworking Guidelines, Version 3.1.0, February 2003.

Figure 2:
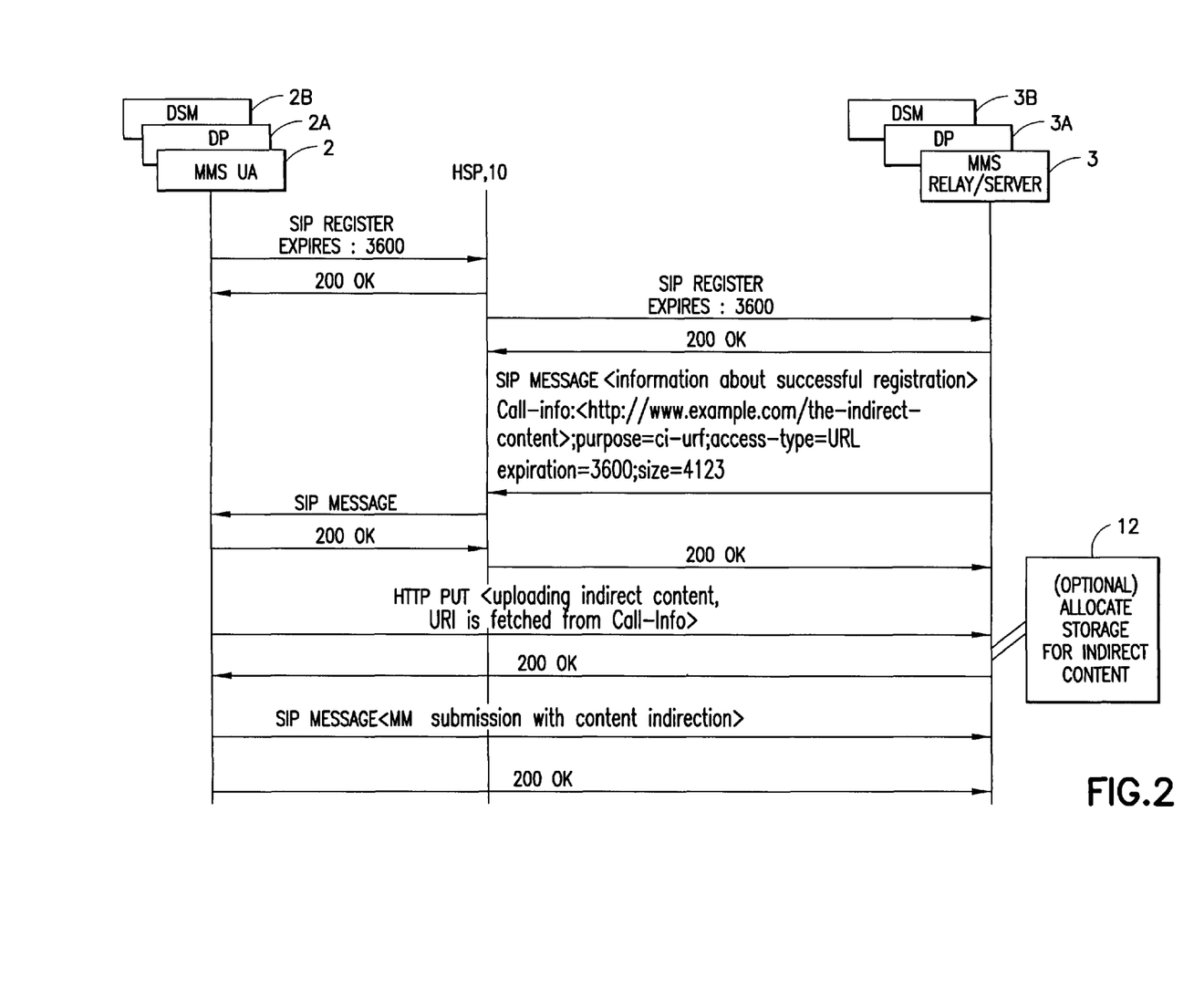
FIG. 2 is a message flow diagram that illustrates the use of this invention in a Multimedia Messaging Service (MMS) architectured system.

Referring now to FIG. 2, and more specifically when applying this invention to the 3GPP2 SIP-based MMS MM1 interface specification, the specification is revised in the following manner: the third-party registration procedure between a Home Service Proxy (HSP) 10 and the MMS Relay/Server (the AS 3 in the MMS case) is extended so that the MMS Relay/Server preferably always informs the MMS UA 2 about the success/failure of the registration with the MMS service. This allows the MMS Relay/Server to send a SIP MESSAGE request to the MMS UA 2 after every registration or re-registration cycle. When sending the SIP MESSAGE request to the MMS UA 2, the MMS Relay/Server includes a Call-Info header field carrying an HTTP URI for "ci-uri" purposes. This URI remains valid until the MMS UA 2 re-registers, de-registers, or the registration of the MMS UA 2 expires. This implies that the MMS Relay/Server reserves a HTTP URI for every registering MMS UA, with the lifetime equal to the registration lifetime, thereby allowing the MMS UA 2 to perform content indirection at any time during its valid registration period. This procedure also eliminates the need for the MMS UA 2 to explicitly request a storage location before MM submission, since the storage location is reserved on the MMS Relay/Server after the MMS UA 2 registers with the service, and it remains available for the MMS UA 2 while it stays registered.

The message exchange diagram of FIG. 2 illustrates the foregoing behavior. Note that the SIP message informing the MMS UA 2 of the successful SIP registration has a Call-Info header with the purpose parameter set to "ci-uri". Subsequently the MMS UA 2 performs a HTTP PUT (or some other equivalent type of push operation, depending on the technology) to upload the information that corresponds to the indirect content to the location specified by the URI found in the Call-Info part of the SIP message received after registration.

It should be noted that the URI found in the Call-Info header field may not point to an actual or physical storage location reserved by the HSP 10 for indirect content. Instead, the HSP 10 redirects a MMS UA 2 PUT request that is directed to the URI found in the Call-Info header field to an actual storage location. Redirection may be performed by the HSP 10 replying to the HTTP PUT request with HTTP 3xx responses. One benefit that is obtained through the use of this approach is that HSP 10 need not allocate physical storage locations for the MMS US 2 at the time of the MMS UA 2 registration. Instead, the HSP 10 need only reserve or allocate storage locations when there is an actual need for the storage, at the time of the MMS UA 2 sending the HTTP PUT request. These operations are shown in FIG. 2 as the (optional) block 12, which is intended to indicate that the server 3 may allocate storage, and redirect uploaded information to the allocated storage in response to the HTTP PUT from the device 2.

Examining the message flow of FIG. 2 in even greater detail, it can be noticed that the first REGISTER transaction is between the UA 2 and the HSP 10. The HSP 10 functions as a SIP registrar, exhibiting normal SIP functionality. Based on this transaction, the HSP 10 generates a third-party REGISTER request to inform the AS 3 (the MMS Relay Server in this case) of the registration status of the UA 2. From the SIP point of view, this is another SIP registration functionality, where the AS 3 acts as a registrar and the HSP 10 registers the UA 2 as a third-party.

It can be noted that in the IMS case (FIG. 1) the requirement is not to register the UE 2 with the AS 3, the goal is instead only to inform the AS 3 that the UE 2 has been registered with the HSP 10 (the HSP, interposed between the UE 2 and the AS 3, is not shown in FIG. 1). Therefore the AS 3 does not actually function as a SIP registrar in the IMS case, instead it simply stores the registration status of the UE 2, with the expiry.

In any event, based on the previous third-party registration from the HSP 10 the AS 3 generates a SIP MESSAGE, which is targeted to the UA 2 and routed via the HSP 10 (routing via the HSP 10 is performed simply because the AS 3 has no direct SIP interface to the UA 2). This SIP message originated by the AS 3 conveys the Call-Info header field to the UA 2 with the purpose parameter set to ci-uri for indicating to the UA 2 (or UE 2) that the Call-Info header contains a URI that specifies the address of the storage location for use in content indirection. In that all UEs/UAs upon registration are automatically allocated a URI for content indirection purposes, whether used or not, the use of this invention eliminates a need to provide additional (possibly unstandardized) signaling exchanges where the UE/UA must specifically request the allocation of a URI.

It should be noted that the allocated URI may be one that is allocated in common to all UEs/UAs, and as was noted previously, a "real" URI that points to the actual storage location (s) is only reserved when the UE/UA actually needs to perform content indirection.

Reference is again made to the draft-khartabil-sip-policy-uri-call-info-purpose-00 document. Note that while this document extends the Call-Info purpose parameter with a value of "policy-uri", that is used by a caller or a callee to convey a URI where a certain policy pertaining to the session can be accessed, this document does not suggest the use of the purpose parameter for SIP content indirection in the manner that is disclosed with regard to the embodiments of this invention.

Also, it is noted that one possible application for SIP content indirection is described in 3GPP2 X.P0016-312. This specification defines the behavior for a SIP-based MM submission. If the size of the MMS message does not satisfy the message size constraints described in RFC3428 (SIP MESSAGE method), then the MMS UA uses content indirection to submit the MM to a MMS Relay/Server. In order to perform this operation the MMS UA requests a storage location from the MMS Relay/Server. However, the request of a storage location by the MMS UA is not equivalent to the use of the Call-Info header with a purpose=ci-uri procedure in accordance with this invention.

SIP protocol details of the 3GPP IP Multimedia Subsystem (IMS) and 3GPP2 Multimedia Domain (MMD) are defined in 3GPP TS 24.229 and 3GPP2 X.S0013.4. 3GPP2 X.P0016-312 is the 3GPP2 SIP-based MMS MM1 interface specification (Stage-3).

The foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims. As but some examples, the use of other similar or equivalent messaging formats and system architectures (e.g., other than the IMS: and MMS architectures) may be attempted by those skilled in the art. This invention may also be employed for secure SIP (SIPS) operations. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method comprising:
   receiving, by a server, a registration request from a device; and
   in response to receiving the registration request, sending a session initiation protocol message from the server to the device, where the session initiation protocol message comprises an address of a storage location for the device to send information that is to be referenced by a subsequent content indirection operation, where the session initiation protocol message comprises a Call-Info header with a purpose parameter set to ci-uri for indicating that the Call-Info header contains a uniform resource identifier that specifies the address of the storage location.

2. The method as in claim 1, further comprising allocating a resource for the information.

3. The method as in claim 2, where the resource comprises storage.

4. The method as in claim 2, where allocating occurs in response to the device sending the information.

5. The method as in claim 1, where the message comprises a session initiation protocol message.

6. The method as in claim 1, where the registration request comprises a session initiation protocol registration request.

7. The method as in claim 1, where the message is sent through a Ut interface of an internet protocol multimedia system.

8. The method as in claim 1, where informing occurs via a home service proxy node in a multimedia messaging service system.

9. The method as in claim 1, where the uniform resource identifier is reserved for the device for the time during which the device is registered.

10. The method as in claim 1, further comprising:
    responsive to the device sending the information, allocating storage and directing the information to the allocated storage.

11. The method as in claim 1, where the server comprises a session initiation protocol server.

12. An apparatus comprising:
    a receiver configured to receive a registration request from a device; and
    a data processor that is responsive to receipt of the registration request to send a session initiation protocol message to the device, the session initiation protocol message comprising an address of a storage location for the device to send information that is to be referenced by a subsequent content indirection operation, where the session initiation protocol message comprises a Call-Info header with a purpose parameter set to ci-uri for indicating that the Call-Info header contains a uniform resource identifier that specifies the address of the storage location.

13. The apparatus as in claim 12, where the registration request and the message pass through a Ut interface of an internet protocol multimedia system.

14. The apparatus as in claim 12, where in a multimedia messaging service system the registration request triggers a third party registration request that is made by a home server proxy, and the message reaches the device via the home server proxy.

15. The apparatus as in claim 12, where the uniform resource identifier is reserved for the device for the time during which the device is registered.

16. The apparatus as in claim 12, where the data processor is operable, responsive to the device sending the information, to allocate storage and to direct the information to the allocated storage.

17. The apparatus as in claim 12, where the apparatus comprises a session initiation protocol server and the registration request comprises a session initiation protocol registration request.

18. An apparatus comprising:
    a transmitter configured to send a registration request message to a server;
    a receiver configured to receive a session initiation protocol message from the server, the session initiation protocol message being sent in response to the registration request message; and
    a data processor, responsive to receipt of the session initiation protocol message operable to extract from the session initiation protocol message an address of a storage location for the apparatus to send information that is to be referenced by a subsequent content indirection operation, where the session initiation protocol message comprises a Call-Info header with a purpose parameter set to ci-uri for indicating that the Call-Info header contains a uniform resource identifier that specifies the address of the storage location.

19. The apparatus as in claim 18, where the data processor is further operable to send the information to the location.

20. The apparatus as in claim 19, where the data processor sends the information using a HTTP PUT procedure.

21. The apparatus as in claim 19, where the server comprises a session initiation protocol server, and where the data processor sends the information using a non-session initiation protocol procedure.

22. The apparatus as in claim 19, where the server comprises a session initiation protocol server, and where the session initiation protocol message is received, and the information is sent, through a Ut interface of an internet protocol multimedia system.

23. The apparatus as in claim 18, where the server comprises a session initiation protocol server, and where in a multimedia messaging service system originating a session initiation protocol registration request triggers a third party registration request that is made by a home server proxy, and the message reaches the apparatus via the home server proxy.

24. The apparatus as in claim 18, where the server comprises a session initiation protocol server, and where the apparatus uses the extracted address for the time during which the apparatus is registered with the session initiation protocol server.

25. The apparatus as in claim 18, where the apparatus comprises a portable unit, a portable terminal or a cellular telephone.

26. The device as in claim 18, where the data processor uses a secure session initiation protocol procedure.

27. The apparatus of claim 18, where the apparatus comprises a portable unit, a portable terminal or a cellular telephone.

28. A non-transitory data storage medium readable by a digital data processor, said data storage medium storing program instructions comprising operations of:
receiving a registration request from a device; and
in response to receiving the registration request, sending a session initiation protocol message to the device, where the session initiation protocol message comprises an address of a storage location for the device to send information that is to be referenced by a subsequent content indirection operation, where the session initiation protocol message comprises a Call-Info header with a purpose parameter set to ci-uri for indicating that the Call-Info header contains a uniform resource identifier that specifies the address of the storage location.

29. The data storage medium as in claim 28, where the request is received at a multimedia messaging service relay/server, and where the sending operation occurs via a home serving proxy.

30. The data storage medium as in claim 28, where the uniform resource identifier is reserved for the device for the time during which the device is registered.

31. The data storage medium as in claim 28, where a session initiation protocol server comprises the data storage medium and the registration request comprises a session initiation protocol registration request.

32. An apparatus comprising:
means for receiving a session initiation protocol registration request from a device;
means, responsive to receiving the session initiation protocol registration request, for sending a session initiation protocol message to the device, where the session initiation protocol message comprises an address of a storage location for the device to send information that is to be referenced by a subsequent session initiation protocol content indirection operation, where the session initiation protocol message comprises a Call-Info header with a purpose parameter set to ci-uri for indicating that the Call-Info header contains a uniform resource identifier that specifies the address of the storage location.

33. A non-transitory data storage medium readable by a digital data processor of an apparatus, said data storage medium storing program instructions comprising operations of:
sending a registration request message to a server;
receiving a session initiation protocol message from the server in response to the registration request message; and
identifying a case where the received session initiation protocol message comprises an address of a storage location that has been reserved for the apparatus, where the storage location is for the apparatus to store information that is to be referenced by a subsequent content indirection operation, where the session initiation protocol message comprises a Call-Info header with a purpose parameter set to ci-uri for indicating that the Call-Info header contains a uniform resource identifier that specifies the address of the storage location.

34. The data storage medium as in claim 33, where at least one of the operations comprises using a secure session initiation protocol operation.

35. The data storage medium of claim 33, the operations further comprising: sending the information to the storage location.

36. The data storage medium as in claim 35, where sending the information to the storage location comprises using a HTTP procedure.

37. The data storage medium as in claim 35, where sending the information to the storage location comprises using a HTTP PUT to upload information corresponding to indirect content to the storage location.

38. The data storage medium of claim 33, where the registration request message comprises a session initiation protocol registration request message and the server comprises a session initiation protocol server, where the program instructions are for use in a session initiation protocol content indirection procedure with the session initiation protocol server.

39. An apparatus comprising:
means for sending a registration request to a server;
means for receiving a session initiation protocol message from the server in response to the registration request;
means, responsive to receipt of the session initiation protocol message, for identifying a case where the session initiation protocol message comprises an address of a storage location that has been reserved for the apparatus, where the storage location is for the apparatus to store information that is to be referenced by a subsequent content indirection operation, where the session initiation protocol message comprises a Call-Info header with a purpose parameter set to ci-uri for indicating that the Call-Info header contains a uniform resource identifier that specifies the address of the storage location; and
means for uploading the information that corresponds to indirect content with a HTTP PUT to the storage location specified by the address.

40. The apparatus of claim 39, where the registration request comprises a session initiation protocol registration request, the server comprises a session initiation protocol server and the subsequent content indirection operation comprises a subsequent session initiation protocol content indirection operation, where the session initiation protocol message indicates success or failure of the session initiation protocol registration request, where the information corresponds to indirect content, where the means for uploading is further for uploading the indirect content with a HTTP PUT to the storage location specified by the uniform resource identifier.

41. A data storage medium readable by a digital data processor, said data storage medium storing program instructions operable for a session initiation protocol server to conduct a session initiation protocol session with a device, comprising operations of:
receiving a session initiation protocol registration request from the device;
in response to receipt of the session initiation protocol registration request, sending the device a session initiation protocol message that comprises an address of a storage location for the device to send information that is to be referenced by a subsequent session initiation protocol content indirection operation, where the session initiation protocol message comprises a Call-Info header with a purpose parameter set to ci-uri for indicating that the Call-Info header contains a uniform resource identifier that specifies the address of the storage location; and responsive to the device sending the information, allocating storage and directing the information to the allocated storage.

42. A method comprising:

sending, by an apparatus, a registration request to a server;

receiving, at the apparatus, a session initiation protocol message from the server in response to the registration request; and identifying a case where the session initiation protocol message comprises an address of a storage location that has been reserved for the apparatus, where the storage location is for the apparatus to store information that is to be referenced by a subsequent content indirection operation, where the session initiation protocol message comprises a Call-Info header with a purpose parameter set to ci-uri for indicating that the Call-Info header contains a uniform resource identifier that specifies the address of the storage location.

43. The method as in claim 42, where at least one of the steps comprises using a secure session initiation protocol operation.

44. The method of claim 42, further comprising: sending the information to the storage location.

45. The method as in claim 44, where sending the information to the storage location comprises using a HTTP procedure.

46. The method as in claim 44, where sending the information to the storage location comprises using a HTTP PUT to upload information corresponding to indirect content to the storage location.

47. The method of claim 42, where the server comprises a session initiation protocol server and where the method is for operating an apparatus to conduct a session initiation protocol operation with the session initiation protocol server.

* * * * *